US012044044B2

(12) United States Patent
Escalante et al.

(10) Patent No.: US 12,044,044 B2
(45) Date of Patent: Jul. 23, 2024

(54) CAPACITIVE SENSOR FOR A MOTOR VEHICLE

(71) Applicant: Vitesco Technologies GmbH, Regensburg (DE)

(72) Inventors: Yannis Escalante, Toulouse (FR); Bertrand Vaysse, Toulouse (FR); Baptiste Lorenzi, Toulouse (FR); Mathieu Girodin, Toulouse (FR)

(73) Assignee: Vitesco Technologies GmbH, Regensburg (DE)

( * ) Notice: Subject to any disclaimer, the term of this patent is extended or adjusted under 35 U.S.C. 154(b) by 391 days.

(21) Appl. No.: 17/607,526

(22) PCT Filed: May 28, 2020

(86) PCT No.: PCT/EP2020/064847
§ 371 (c)(1),
(2) Date: Oct. 29, 2021

(87) PCT Pub. No.: WO2020/239915
PCT Pub. Date: Dec. 3, 2020

(65) Prior Publication Data
US 2022/0205285 A1 Jun. 30, 2022

(30) Foreign Application Priority Data
May 28, 2019 (FR) ....................................... 1905648

(51) Int. Cl.
*E05B 81/76* (2014.01)
*E05B 81/78* (2014.01)
(Continued)

(52) U.S. Cl.
CPC .............. *E05B 81/77* (2013.01); *E05B 81/78* (2013.01); *E05B 83/36* (2013.01); *E05B 85/16* (2013.01)

(58) Field of Classification Search
CPC .......... E05B 81/77; E05B 81/78; E05B 83/36; E05B 85/16; G07C 9/00174; G07C 2209/65
See application file for complete search history.

(56) References Cited

U.S. PATENT DOCUMENTS 7,205,777 B2 4/2007 Schulz et al.
9,000,889 B2 4/2015 Baudru et al.
(Continued)

FOREIGN PATENT DOCUMENTS

CN 1579849 A 2/2005
CN 102914800 A 2/2013
(Continued)

OTHER PUBLICATIONS

Chinese Office Action for Chinese Application No. 202080039242.5, dated Feb. 9, 2023, 6 pages.
(Continued)

*Primary Examiner* — Joseph H Feild
*Assistant Examiner* — Sharmin Akhter
(74) *Attorney, Agent, or Firm* — Buchanan Ingersoll & Rooney PC

(57) ABSTRACT

A method for detecting actuation of a handle of a motor-vehicle opening panel-vehicle, including the steps of continuously generating the request to unlock signal, detecting an increase in the value of the request to unlock signal beyond a first predetermined detection threshold representative of the presence of a hand of a user on the handle, detecting a decrease in the value of the request to unlock signal below a second predetermined detection threshold representative of the user pulling on the handle, consecutively to the detection of the decrease in the value of the request to unlock signal below the second detection threshold, triggering a time counter, stopping the time counter at
(Continued)

the end of a predetermined "confirmation time", and validating the detection of a request to unlock the opening panel if the value of the request to unlock signal remained greater than a third predetermined threshold throughout the confirmation time.

10 Claims, 2 Drawing Sheets

(51) Int. Cl.
*E05B 83/36* (2014.01)
*E05B 85/16* (2014.01)

(56) References Cited

U.S. PATENT DOCUMENTS

| | | | |
|---|---|---|---|
| 9,573,565 | B2 | 2/2017 | Schindler et al. |
| 9,640,006 | B2 | 5/2017 | Guibbert et al. |
| 9,953,476 | B2 | 4/2018 | Murphy et al. |
| 10,879,897 | B2 | 12/2020 | Spick et al. |
| 2013/0033362 | A1 | 2/2013 | Hourne |
| 2016/0078701 | A1* | 3/2016 | Guibbert .................. G07C 9/30 340/5.72 |
| 2016/0138941 | A1 | 5/2016 | Hirota et al. |

FOREIGN PATENT DOCUMENTS

| | | | |
|---|---|---|---|
| CN | 103125072 | A | 5/2013 |
| CN | 105358389 | A | 2/2016 |
| CN | 105607613 | A | 5/2016 |
| CN | 107590880 | A | 1/2018 |
| FR | 3025824 | A1 | 3/2016 |
| FR | 3063097 | A1 | 8/2018 |

OTHER PUBLICATIONS

International Search Report and Written Opinion for International Application No. PCT/EP2020/064847, mailed Jul. 29, 2020, with partial English translation, 9 pages.
International Search Report and Written Opinion for International Application No. PCT/EP2020/064847, mailed Jul. 29, 2020, 13 pages (French).

* cited by examiner

CAPACITIVE SENSOR FOR A MOTOR VEHICLE

CROSS REFERENCE TO RELATED APPLICATIONS

This application is the U.S. National Phase application of PCT International Application No. PCT/EP2020/064847, filed May 28, 2020, which claims priority to French Patent Application No. 1905648, filed May 28, 2019, the contents of such applications being incorporated by reference herein.

FIELD OF THE INVENTION

The present invention relates to the field of detection sensors, and more particularly to a capacitive detection sensor for a motor vehicle, as well as to a motor vehicle comprising such a sensor. an aim of the sensor according to the invention is, in particular, to enable the detection of a user's desire to unlock one or more vehicle opening panels by pulling on a handle.

BACKGROUND OF THE INVENTION

These days, it is known to use capacitive sensors to detect the presence of a user in the vicinity of a motor vehicle and to unlock the opening panels thereof. These sensors are in particular mounted in the door handles or in the rear trunk of the vehicle in order to detect the presence of the user's hand or foot respectively. These capacitive sensors detect variations in the electromagnetic field between an electrode on the sensor and the human body, which causes the capacitance of the sensor to vary as the user approaches.

As these sensors can be particularly energy inefficient, it is in particular known to detect the handle being pulled before activating unlocking of the opening panels, in order to ensure that the user really wishes to unlock them rather than solely detecting the presence of the hand on or in the vicinity of the handle, which could be accidental, and unlocking the opening panels directly.

In a known solution, a Hall-effect sensor is used in association with a magnet. The magnet is in the fixed part of the handle and the sensor is in the movable part of the handle. They are arranged such that the sensor detects a high-strength magnetic field when the handle is in the rest position and a low-strength magnetic field when the handle is in the pulled position. However, this type of Hall-effect sensor has several limitations. First of all, the cost of its components is relatively high. In addition, it requires additional costs of integration, in particular of the magnet into the fixed part of the handle. It also leads to mechanical limitations in terms of positioning, in particular of the sensor in relation to the magnet, and in terms of bulk. Lastly, its electrical consumption is significantly high for a detection sensor due to the use of the Hall effect.

In order to at least partially overcome these drawbacks, a known capacitive-sensor solution, described in the French patent application FR3025824A1, incorporated herein by reference, proposes to use the variations in the detection-zone signals. This solution uses a request to unlock signal and the variations, in the capacitance of a so-called "locking" electrode, observed during the movement of the handle in order to detect that the handle has been actuated. More precisely, the electrode is located in the vicinity of the door and the counter-grip, which are metal parts. The presence of these metal parts in the environment close to the electrode affects the value of the capacitance across the terminals of said electrode.

Once the user's hand is placed on the handle, a detection module, comprising a so-called "unlocking" electrode, emits a signal representative of a request to unlock. Then, as the user pulls the handle, the movement of the handle away from the door causes the locking electrode to also move away from the door and/or the counter-grip, this creating a decrease in the variation in the capacitance of the locking electrode with respect to its initial value when the handle is in the non-actuated, rest position. This decrease in variation in the locking-electrode capacitance reaches a minimum when the handle is fully pulled then remains substantially constant when the handle is in the pulled position, at a maximum distance from the door.

The sensor system used in this solution uses the correlation between the request to unlock signal and the signal representing the variations in the capacitance of the locking electrode. More precisely, the request to unlock signal must be representative of a request to unlock for a first predetermined time followed by a negative variation below a certain threshold in the capacitance of the locking electrode for a second predetermined time.

This solution therefore requires both a locking electrode and an unlocking electrode. However, some capacitive sensors in use at the present time to detect the presence of a hand on a door handle comprise only an unlocking electrode and lack a locking electrode. In this case, the solution proposed in the French patent application FR3025824A1 is not applicable. Furthermore, there is advantageously the need to increase the robustness of the solution described in the French patent application FR3025824A1.

It would therefore be advantageous to propose a simple, reliable, effective, and inexpensive solution for capacitive sensors for motor vehicles in order to overcome at least some of the drawbacks of the existing solutions, in particular as regards single-electrode capacitive sensors.

SUMMARY OF THE INVENTION

To this end, a first aspect of the invention is a method for detecting actuation of a handle of a motor-vehicle opening panel, said handle being capable of moving between a rest position and a pulled position and including a sensor comprising an unlocking detection device defining a so-called "request to unlock" signal which varies as a user's hand approaches the handle, and a detection module connected to said unlocking detection device, said method being notable in that it comprises the steps of:

- continuously generating the request to unlock signal,
- detecting, with the detection module, an increase in the value of the request to unlock signal beyond a first predetermined detection threshold representative of the presence of a user's hand on the handle,
- detecting, with the detection module, a decrease in the value of the request to unlock signal below a second predetermined detection threshold representative of the handle being pulled by a user into a pulled, preferably maximum, position,
- consecutively to the detection of the decrease in the value of the request to unlock signal below the second detection threshold, triggering, with the detection module, a time counter,
- stopping, with the detection module, said time counter at the end of a predetermined so-called "confirmation" time, validating, with the detection module, the detection of a request to unlock the opening panel if the value of the request to unlock signal remained greater than a third predetermined detection threshold throughout the confirmation time.

The method according to an aspect of the invention makes it possible to characterize the way in which a handle is grasped and pulled by a user on the basis of a single signal (the request to unlock signal) and does not require two signals generated using two distinct sensor elements to be correlated.

Preferably, the unlocking detection device comprises a so-called "unlocking" electrode or consists of a so-called "unlocking" electrode, which is a simple, effective, and inexpensive means of enabling the generation of a request to unlock signal.

In one embodiment, the sensor lacks a second so-called "locking" electrode, making the sensor less complex and less expensive.

Preferably, the detection of a request to unlock the opening panel is validated if the value of the request to unlock signal remained both less than the second detection threshold and greater than the third detection threshold throughout the confirmation time.

Also preferably, the confirmation time is between 40 and 1200 ms in order to reliably and effectively characterize a request to unlock.

Advantageously, the first detection threshold is greater than 70% of the operating range of the sensor, which range is called the "useful" range, in order to unambiguously characterize a sufficiently significant pull on the handle by the user.

Also advantageously, the second detection threshold is between 45 and 70% of the useful range of the sensor in order to ensure that the handle is maintained in a sufficiently pulled, preferably maximum, position by the user.

Also advantageously, the third detection threshold is greater than 45% of the useful range of the sensor in order to ensure that the handle has not been released and returned to its rest position by the user.

According to one aspect of the invention, the value of the request to unlock signal remains greater than the first detection threshold for a predetermined so-called "detection" time, for example between 20 and 40 ms, and preferably of the order of 30 ms, in order to ensure that the handle has been pulled sufficiently far from its rest position by the user.

In one embodiment, the same time counter is advantageously used to measure the detection time and the confirmation time.

In another embodiment, two different time counters are used to measure the detection time and the confirmation time.

According to one aspect of the invention, the method comprises a step of sending an unlocking command to a computer of the vehicle.

An aspect of the invention also relates to a capacitive sensor for a motor vehicle, said sensor comprising:

an unlocking detection device capable of being mounted in a handle of the vehicle, in particular of a door, and defining a so-called "request to unlock" signal which varies as a user's hand approaches the handle, and a detection module electrically connected to said unlocking detection device, said sensor being notable in that it is configured to implement the method such as described above.

In one embodiment, the unlocking detection device comprises a single electrode corresponding to the unlocking electrode and the detection module is capable of generating a so-called "request to unlock" signal representative of the variations in capacitance across the terminals of said electrode.

In another embodiment, the unlocking detection device comprises a first electrode corresponding to the unlocking electrode and a second electrode corresponding to a locking electrode, the voltage variations of which are representative of a movement of the handle, the request to unlock signal, generated by the detection module from the voltage measured across the terminals of the unlocking electrode, being representative of the variations in capacitance across the terminals of said unlocking electrode.

In another embodiment, the unlocking detection device comprises an optical emitter, a piezoelectric cell, an inductive sensor or a mechanical microswitch.

An aspect of the invention finally relates to a motor vehicle comprising at least a handle, and a sensor such as described above.

BRIEF DESCRIPTION OF THE DRAWINGS

Other features and advantages of aspects of the invention will become more clearly apparent on reading the following description. This description is purely illustrative and must be read with reference to the accompanying drawings, in which.

DETAILED DESCRIPTION OF THE PREFERRED EMBODIMENTS

An aspect of the invention is intended to be implemented in a motor vehicle with the aim of detecting the pull on a handle in order, in particular, to unlock one or more opening panels of the vehicle. An aspect of the invention is implemented by a capacitive-sensor device mounted at least in part in a handle of a motor vehicle. It should be noted, however, that such an implementation does not limit the scope of an aspect of the invention, which could in other embodiments be implemented in any other function or element of a vehicle, in particular a motor vehicle.

Figure 1:
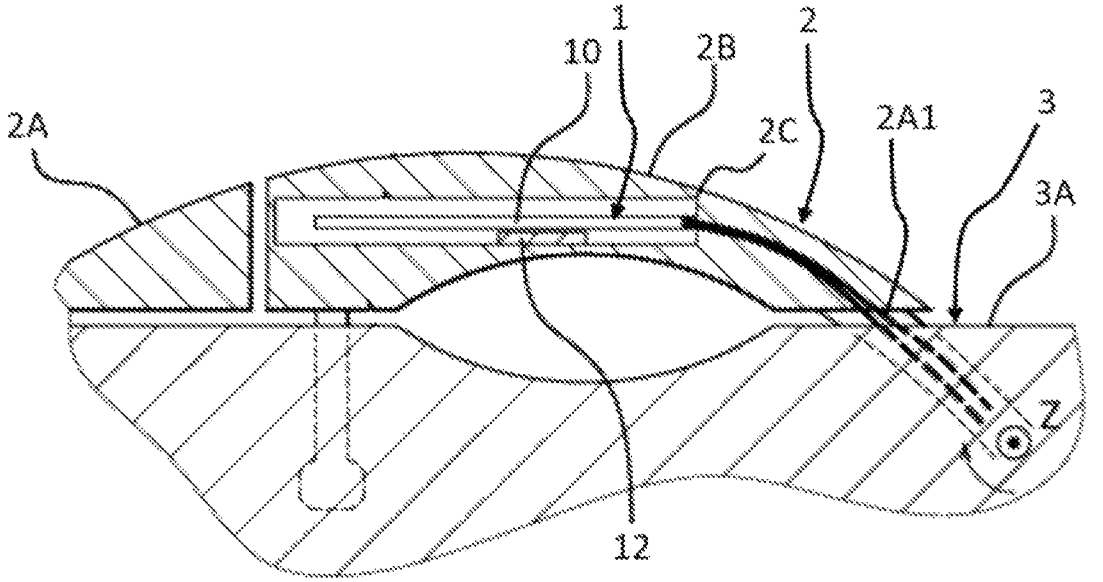
FIG. 1 is a door handle comprising an embodiment of the sensor according to an aspect of the invention.

FIG. 1 shows a handle 2 of a motor-vehicle door 3 comprising an example of a sensor 1 according to an aspect of the invention, but it will be noted that the sensor 1 according to an aspect of the invention could be mounted in another element of the vehicle, for example in a trunk handle. The handle 2 comprises a fixed part 2A, mounted on the panel 3A of the door 3, and a movable part 2B, which is mounted on the panel 3A so as to be able to rotate about an axis Z via one 2A1 of its ends and which is capable of moving between a rest position (FIG. 1) and a pulled position in which said movable part 2B is moved away from the fixed part 2A and from the panel 3A when said movable part is pulled by a user.

In this example, the sensor 1 is integrally mounted in the handle 2 and comprises an unlocking detection device, which in this preferred example takes the form of a so-called "unlocking" electrode 10, and a detection module 12. The unlocking electrode 10 is mounted in a housing 2C formed in the movable part 2B of the handle 2 and defines a capacitance that can vary when a hand is placed on the movable part 2B and pulls said movable part 2B. The voltage variations across the terminals of this unlocking electrode 10 represent the variations in capacitance of said unlocking electrode 10 and are measured by the detection module 12 in order to generate a so-called "request to unlock" signal S (FIG. 2) as will be detailed below. The variations in capacitance are generated in particular by the approach and presence of a user's hand on the handle 2. In this embodiment, the sensor 1 comprises a single electrode. However, in another embodiment, the sensor 1 could comprise a second so-called "locking" electrode capable of detecting the movement of the handle 2 by a user.

Still referring to FIG. 1, the detection module 12 is also mounted in the movable part 2B of the handle 2 and is electrically connected to the unlocking electrode 10. As a variant, the detection module 12 could be mounted in the door 3.

In this example, the detection module 12 is configured to generate a so-called "request to unlock" signal S (FIG. 2) representative of the variations in capacitance of the unlocking electrode 10, which vary as a user's hand approaches the handle 2, as explained above.

The detection module 12 is configured to detect an increase in the value of the request to unlock signal S beyond a first predetermined detection threshold 51 (FIG. 2) representative of a placement of a user's hand on the movable part 2B of the handle 2.

The detection module 12 is configured to detect a decrease in the value of the request to unlock signal S below a second predetermined detection threshold S2 representative of the movable part 2B of the handle 2 being pulled into a pulled, preferably maximum, position.

The detection module 12 is configured, consecutively to the detection of the decrease in the value of the request to unlock signal S below the second detection threshold S2, to trigger a time counter (not shown).

The detection module 12 is configured to stop said time counter at the end of a predetermined so-called "confirmation" time $D_C$.

The detection module 12 is configured to validate the detection of a request to unlock the door 3 by a user if the value of the request to unlock signal S remained greater than a third predetermined detection threshold S3 throughout the confirmation time $D_C$ measured by the counter. Preferably, the detection module 12 is configured to validate the detection of a request to unlock the door 3 by a user if the value of the request to unlock signal remained both less than the second detection threshold S2 for the confirmation time $D_C$ and greater than the third detection threshold S3 throughout the confirmation time $D_C$.

Preferably, the confirmation time $D_C$ is between 40 and 1200 ms, the first detection threshold 51 is between 70 and 100% of the useful range of the sensor 1, the second detection threshold S2 is between 45 and 70% of the useful range of the sensor 1 and the third detection threshold S3 is greater than 45% of the useful range of the sensor 1. The useful range of the sensor 1 is the operating range of the sensor, i.e., the interval of values in which the signal delivered by the sensor is comprised. For example, in FIG. 2, this useful range is bounded between a minimum value Smin, which corresponds to 0% of the useful range, and a maximum value Smax, which corresponds to 100% of the useful range.

In one embodiment, the request to unlock signal S remains between the first detection threshold 51 and the second detection threshold S2 at least for a predetermined so-called "detection" time $D_D$, for example between 20 and 40 ms, and preferably of the order of 30 ms, in order to confirm the detection of the user's hand on the handle 2.

In one embodiment of the sensor 1, the same time counter is used to measure the detection time $D_D$ and the confirmation time $D_C$. As a variant, two different time counters may be used to measure the detection time $D_D$ and the confirmation time $D_C$ respectively.

Advantageously, the detection module 12 is configured to send an unlocking command to a computer (not shown) of the vehicle so that said computer unlocks one or more opening panels of the vehicle, and in particular the door 3 in which the sensor 1 is mounted.

The detection module 12 may advantageously take the form of a microcontroller mounted on a printed circuit board and capable of implementing a series of instructions in order to perform the functions and actions mentioned above.

In another embodiment (not shown), the unlocking detection device may comprise an optical emitter, for example mounted on the door and capable of transmitting a light beam to a receiver located on the handle 2. Thus, when the user's hand approaches the handle 2 and interrupts the light beam, the receiver generates the transmission of a request to unlock signal and sends it to the detection module.

In another embodiment (not shown), the unlocking detection device may comprise a piezoelectric cell, which triggers a request to unlock signal when it undergoes a mechanical deformation due to the mechanical stress of the user's hand gripping the handle 2.

In another embodiment (not shown), the unlocking detection device may comprise an inductive sensor, which triggers a request to unlock signal when a target approaches the sensor via mechanical deformation of the handle 2 (when said handle is gripped by the user's hand).

In another embodiment (not shown), the unlocking detection device may comprise a mechanical microswitch, which generates a request to unlock signal when the deformation of the handle 2 (when said handle is gripped by the user's hand) closes the contact of the switch.

Figure 2:
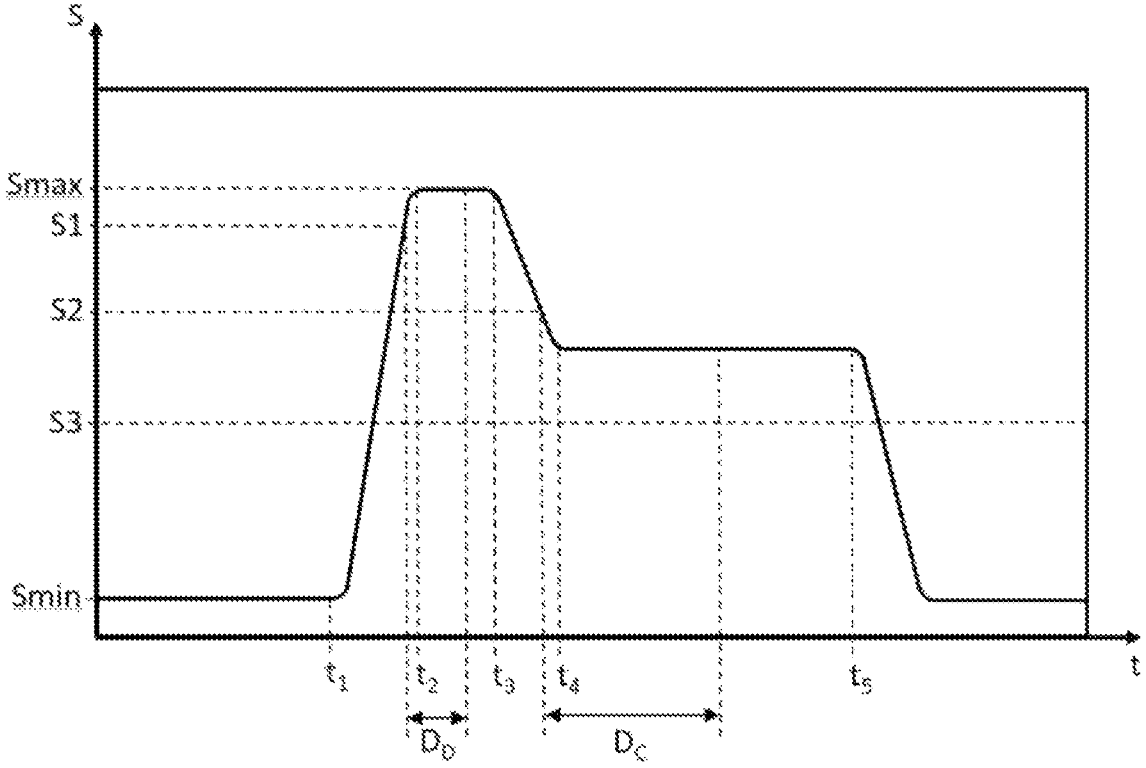
FIG. 2 shows an example of a request to unlock signal, FIG. 3 schematically illustrates an embodiment of the method according to an aspect of the invention.
Figure 3:
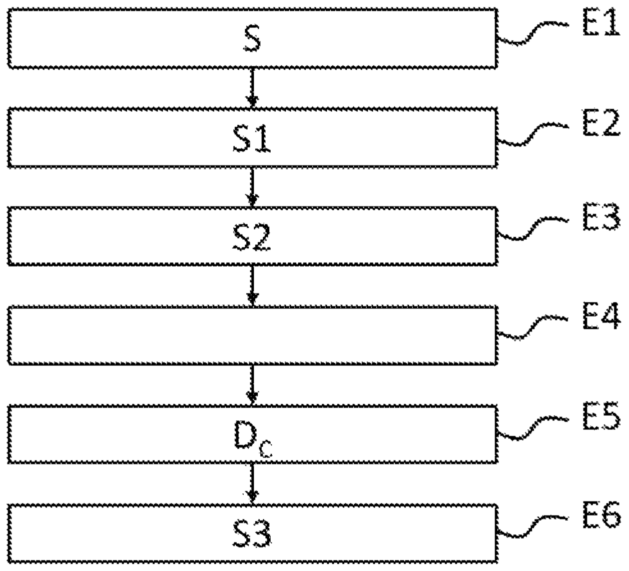

An exemplary embodiment of the invention will now be described with reference to FIGS. 2 and 3.

First, the detection module 12 continuously measures the voltage across the terminals of the unlocking electrode 10 and simultaneously generates, in a step E1, a request to unlock signal S representing the variations in the capacitance of the unlocking electrode 10 from the measured voltage.

When a user approaches his hand to the movable part 2B of the handle 2, the detection module 12 detects that the value of the request to unlock signal S is increasing after a time $t_1$. When the user places his hand on the movable part 2B of the handle 2, the value of the request to unlock signal S exceeds the first detection threshold 51 in a step E2 and then reaches a plateau (Smax) at a time $t_2$. This plateau (Smax) corresponds to the user maintaining his hand on the movable part 2B of the handle 2. When the duration of this plateau is greater than the detection time $D_D$, for example by a few tens of hundredths of a second, the presence of the user's hand on the movable part 2B of the handle 2 is confirmed.

When the movable part 2B of the handle 2 is pulled by the user from a time $t_3$, the detection module 12 detects, between the time $t_3$ and a time $t_4$, a decrease in the value of the request to unlock signal S below the second detection threshold S2 in a step E3. This decrease in capacitance across the terminals of the unlocking electrode 10 reflects the movable part 2B being pulled to the pulled, preferably maximum, position, the unlocking electrode 10 discharging slightly when the movable part 2B is pulled because, the panel 3A being connected to ground, the panel 3A is seen as a metal ground by the movable part 2B. As a result, when the moving part 2B moves away, this is reflected by a decrease in the capacitive value.

Upon detection of the decrease in the value of the request to unlock signal S below the second detection threshold S2, the detection module 12 triggers a time counter (step E4) which counts for the confirmation time $D_C$ and then stops (step E5). During this confirmation time $D_C$ the detection module 12 continuously monitors the value of the request to unlock signal S and validates the detection of the request to unlock the door 3 in a step E6 (or even other opening panels of the vehicle) if the value of the request to unlock signal S remained greater than the third detection threshold S3 and, optionally but preferably, less than the second detection threshold S2 throughout the confirmation time $D_C$. In this case, the detection module 12 sends a command message to the vehicle computer tasked with unlocking the opening panels so that it unlocks at least the door 3 the movable part 2B of the handle 2 of which has been pulled by the user.

In the contrary case, in particular in the case where the movable part 2B of the handle 2 has not been pulled to its maximum or has not been maintained pulled long enough to unambiguously characterize a request to unlock, the detection module 12 does not send a command message to the computer and no opening panel is unlocked.

It will be noted that the request to unlock signal S remains constant between the time $t_4$ and a time $t_5$, this corresponding to a maintenance of the movable part 2B of the handle in a fixed, preferably maximum, pulled position, and then decreases after the time $t_5$, this corresponding to a release of the movable part 2B of the handle 2 to its rest position.

The use of three detection thresholds 51, S2, S3 allows the sensor 1 to reliably recognize a request to unlock on the basis of a single electrode. In particular, the method according to an aspect of the invention makes it possible to identify a signature of the movable part 2B of the handle 2 being grasped and pulled by a user solely on the basis of the request to unlock signal S. The method according to an aspect of the invention may therefore advantageously be used in single-electrode sensors. However, it will be noted that an aspect of the invention also applies to sensors with two (or more) electrodes, one of which is an unlocking electrode 10 within the meaning of an aspect of the present invention.

The invention claimed is:

1. A method for detecting actuation of a handle of a motor-vehicle opening panel, said handle being capable of moving between a rest position and a pulled position and including a sensor comprising an unlocking detection device defining a "request to unlock" signal which varies as a user's hand approaches the handle, and a detection module connected to said unlocking detection device, said method comprising:

continuously generating the request to unlock signal;

detecting, with the detection module, an increase in the value of the request to unlock signal beyond a first predetermined detection threshold representative of a presence of a user's hand on the handle;

detecting, with the detection module, a decrease in the value of the request to unlock signal below a second predetermined detection threshold representative of the handle being pulled by the user;

consecutively, to the detection of the decrease in the value of the request to unlock signal below the second detection threshold, triggering with the detection module of a time counter;

stopping, with the detection module, said time counter at the end of a predetermined "confirmation" time; and validating, with the detection module, the detection of a request to unlock the opening panel if the value of the request to unlock signal remained greater than a third predetermined detection threshold throughout the confirmation time.

2. The method as claimed in claim 1, wherein the detection of a request to unlock the opening panel is validated if the value of the request to unlock signal remained both less than the second detection threshold and greater than the third detection threshold throughout the confirmation time.

3. The method as claimed in claim 1, wherein the confirmation time is between 40 and 1200 ms.

4. The method as claimed in claim 1, wherein the first detection threshold is greater than 70% of a useful range of the sensor.

5. The method as claimed in claim 1, wherein the second detection threshold is between 45 and 70% of a useful range of the sensor.

6. The method as claimed in claim 1, wherein the third detection threshold is greater than 45% of a useful range of the sensor.

7. The method as claimed in claim 1, wherein the value of the request to unlock signal remains greater than the first detection threshold for a predetermined "detection" time.

8. The method as claimed in claim 7, wherein the detection time is between 20 and 40 ms.

9. A capacitive sensor for a motor vehicle, said sensor comprising an unlocking detection device capable of being mounted in a handle of the vehicle and defining a "request to unlock" signal which varies as a user's hand approaches the handle, and a detection module electrically connected to the said unlocking detection device, said sensor being configured to implement the method as claimed in claim 1.

10. A motor vehicle comprising at least a handle, and a sensor as claimed in claim 9.

* * * * *